Jan. 27, 1970  H. H. DEIST  3,491,493
TIRE UNIFORMITY OPTIMIZER
Filed Feb. 20, 1967  2 Sheets-Sheet 1

United States Patent Office 3,491,493
Patented Jan. 27, 1970

3,491,493
TIRE UNIFORMITY OPTIMIZER
Herbert Henry Deist, Akron, Ohio, assignor to The Firestone Tire & Rubber Company, Akron, Ohio, a corporation of Ohio
Filed Feb. 20, 1967, Ser. No. 617,286
Int. Cl. B24b 1/00, 29/00, 5/00
U.S. Cl. 51—324
4 Claims

ABSTRACT OF THE DISCLOSURE

Method and apparatus to improve the dynamic behavior of a pneumatic tire by abrasively removing a portion of the outer surface of said tire. A tire rotating under load exerts a varying force radially upon the axle supporting the tire. This force varies in magnitude depending upon the physical irregularities which occur around the circumference of the tire. The size and location of the maximum radial force exerted by the rotating tire under load is determined. The tire is mounted eccentrically so that the maximum eccentricity coincides with the point of maximum radial force and the tire is then rotated against an abrader which removes material from the tire in such a manner as to compensate for the irregularities in the tire and thereby produce a smoother running tire.

BACKGROUND OF THE INVENTION

This invention relates to a method for treating a pneumatic tire to improve its uniformity. More specifically, it relates to a method of selectively removing rubber from portions of the tread so as to produce a tire having improved uniform behavior under load on a vehicle.

Irregularities which appear in the manufacture of a pneumatic tire can result in a tire which is not completely uniform as to both flexibility and dimensions. These minor irregularities, if small enough, are not noticeable; however, if they exceed this limited allowable variation, the tire may produce a rough ride and cause handling difficulties in service. The degree of non-uniformity of the tire can be measured by known procedures on standard machines. This machinery generally consists of a rim, wheel and axle upon which the tire is mounted, and a road wheel which is placed in contact with the tread of the tire. One method involves the application of a constant, pre-determined load urging the tire against the road wheel, and rotating both tire and road wheel. Load cells mounted on the axle of the road wheel measure the change in stress on the axle as the wheel turns. These stress changes, as measured by the load cells, are charted to give a picture representing the "radial force curve" of the tire. A measurement on this radial force curve of the distance between the greatest and lowest points (the "peak-to-peak" measurement) indicates the degree of non-uniformity of the tire. Arbitrary standards observed in the tire industry will cause those tires having greater than allowable peak-to-peak variation to be graded as unacceptable.

The known method of buffing or grinding the tread surface of a tire to produce a perfectly round tire will be only partially effective to up-grade these tires since this method cannot compensate for internal irregularities.

SUMMARY OF THE INVENTION

It is, therefore, an object of this invention to provide a method for treating a pneumatic tire to produce a tire which is more nearly uniform in its dynamic behavior.

The tire is first run through a "production uniformity grading machine" to produce a radial force curve. A value for the maximum radial force is obtained, and the point at which the highest force measurement was recorded is then marked on the tire. Then a conversion is made whereby the maximum radial force in pounds is converted to the depth adjustment in inches by use of the following formula:

$$R = KF$$

where $R$ = depth adjustment in inches; $F$ = maximum radial force in pounds; $K$ = a constant having units of inches per pound, which is determined emperically for each type of tire. The value of R represents the depth of tread which will be removed at the maximum force point during the buffing operation.

The tire is then mounted on the tire uniformity optimizing machine. This machine has a tire inflation rim which is mounted eccentrically on an axle. The tire is mounted so its maximum force point lines up with the maximum eccentricity point. A grinding wheel or other abrasion means is positioned so that it just touches the shoulder tread rib of the tire at the points of maximum force and eccentricity. Then the grinding wheel is moved radially inward an additional amount equal to R. The tire is rotated until grinding is completed. The operation is then repeated at the opposite shoulder rib. Optionally, the machine may be equipped with a pair of abrasive means so that the grinding may be accomplished on both shoulder ribs at the same time.

Because of the eccentric motion of the roating tire, tread rubber will be buffed from the shoulder ribs in an arc which is centered at the maximum force point and extending on each side of it up to 90°.

While it is obvious that this buffing pattern will not necessarily produce in a treated tire a perfectly flat curve on the uniformity grading machine, the method of the invention provides a simple, convenient procedure for minimizing tire irregularities which may be economically employed under production conditions.

DESCRIPTION OF THE PREFERRED EMBODIMENT

A tire which has been found unacceptable in its dynamic behavior can be marked in any convenient manner to indicate its maximum force point. This point, as well as a value for the maximum force, in pounds is determined, as mentioned above, from curves obtained on the tire uniformity grading machine.

Figure 1:
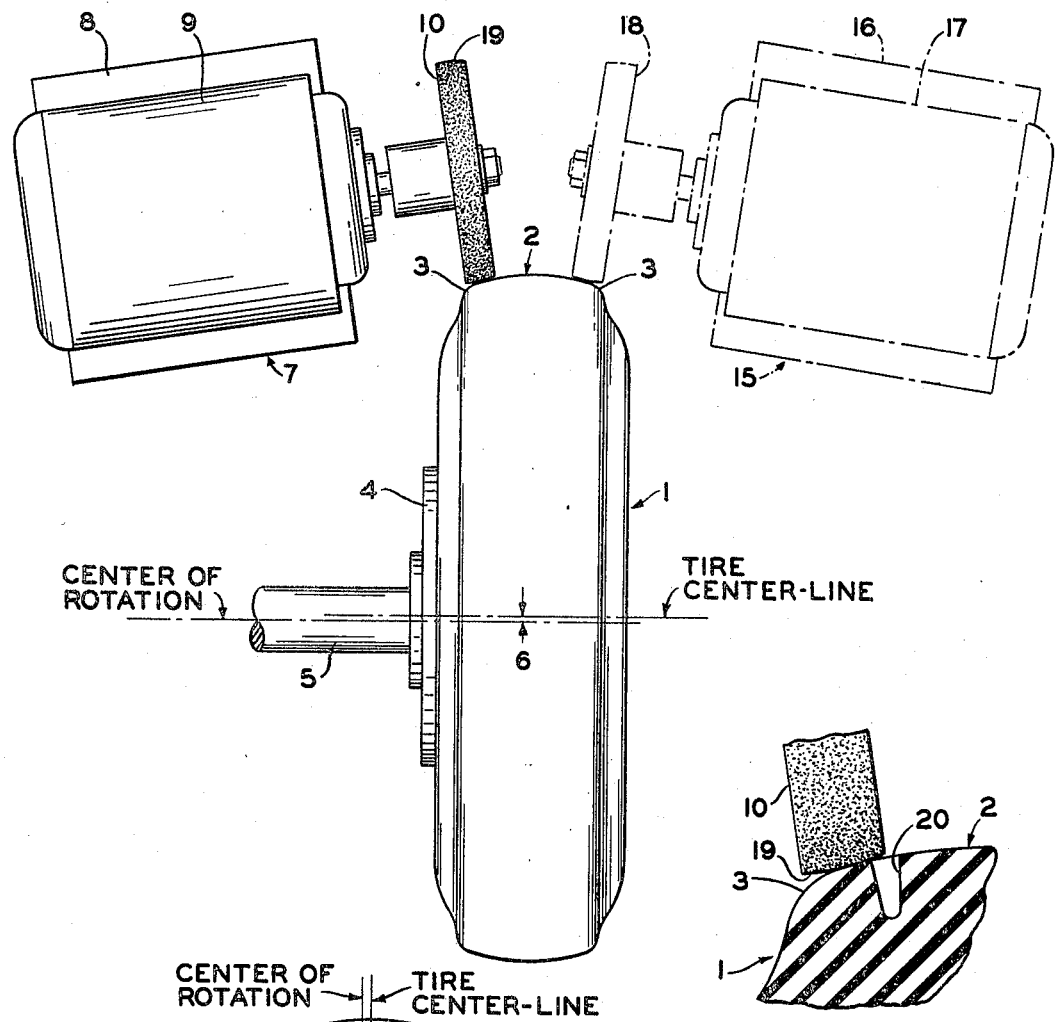
FIGURE 1 is a plan view of the tire, wheel and axle showing the grinding devices.

Referring to the accompanying drawings, in FIG. 1, a tire 1 is mounted on a rim (not shown). This tire and rim assembly is attached to an adapter plate 4 which in turn is mounted on an axle 5, so that the center of the tire is eccentric from the center of rotation of the axle 5, the eccentricity being indicated at 6. The amount of eccentricity may be any value which produces the desired pattern of stock removal. In the apparatus shown, the eccentricity is 0.052 inch. The maximum force point on the tire is located at the point of maximum eccentricity. A grinding device, indicated generally at 7, has a base plate 8 with a motor 9 mounted on it, turning a grinding wheel 10. An optional grinding device 15 has a base plate 16, motor 17, and grinding wheel 18. The grinding devices are positioned so that the grinding wheels 10 and 18 contact the shoulder portions 3 of the tire tread 2. Although the grinding operation can be performed across the entire width of the tire tread 2, it is preferred to limit the grinding to the tread shoulder areas 3.

Initially, the grinding wheels 10 and 18 are positioned to just touch the tread of the tire at the point of maximum eccentricity. The grinding wheel assemblies 7, 15 are then moved radially inward toward the center of rotation a distance of R. The value of R is calculated from the formula $$R = KF$$

where R is the thickness of tread removed at the point of maximum eccentricity, measured in inches; F is the maximum radial force in pounds, and K is a constant having the units of inches per pound. The value of K is determined as follows:

For a given type and size of tire, standard sizes for unloaded diameter and for diameter (under rated load at standard pressure) are obtained. The difference between these two figures is halved to give the change in radius due to load, and this figure in inches is divided by the rated load in pounds to give the constant K. For example, a tire of size 9.00 x 15 has an unloaded diameter of 29.4 inches, and a diameter of 26.8 inches under rated load of 1620 lbs., at 24 p.s.i. inflation pressure. The diameter difference, 2.6 inches, is divided by two to give the radius difference, 1.3 inches. Dividing by the rated load, 1620 lbs., gives a value for K of approximately 0.0008 in./lb.

Thus, if the maximum radial forces measured 30 lbs., inserting the calculated value for K of 0.0008 in./lb. into the equation, a value of 0.024 in. for R is obtained. Because of tread design limitations, a maximum value of R is assigned so that no greater depth of tread is removed than this maximum. Thus, when the calculated value of R exceeds the maximum, the maximum value is used in positioning the grinding wheel.

Figure 2:
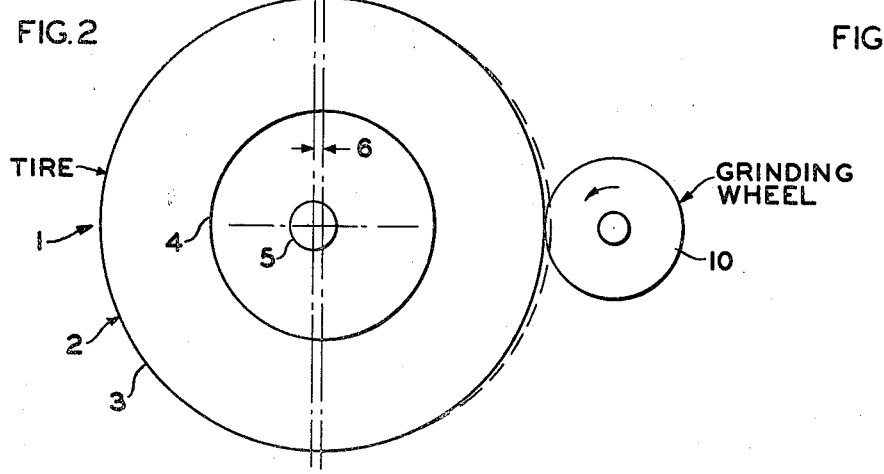
FIGURE 2 is a diagrammatic side elevation of the same apparatus, which shows, in exaggerated scale, the areas of grinding.
Figure 4:
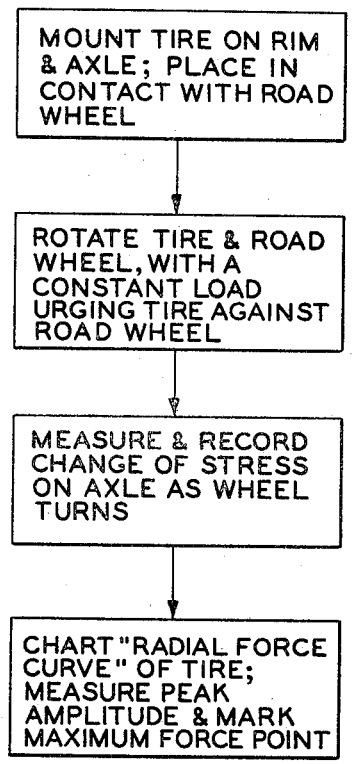
FIGURE 4 is a diagram showing some of the steps of the method of the invention.

When the grinding wheels are properly positioned, the tire and rim assembly is rotated in contact with the rapidly revolving grinding wheel. A speed of 60 r.p.m. was used in rotating the tire and rim, although any convenient speed might be employed. As shown in FIG. 2, tread material is removed along an arc which extends in each direction about 20° to 90° from the point of maximum eccentricity around the perimeter of the tire. The grinding operation is continued until the required amount of tread has been removed, after which time the tire is demounted. The tire can then be re-tested on the tire uniformity grading machine to determine if it is now within specification as to the maximum radial force, determined from the radial force curve.

Figure 3:
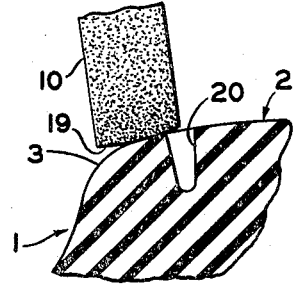
FIGURE 3 is an enlarged horizontal section of the grinding area.

In FIG. 3, the grinding wheel 10 is shown positioned so that one edge is centered on the tread groove 20 and the opposite edge extends beyond the tread shoulder 3. The face 19 of the wheel which is in contact with the tread shoulder 3 is curved, so that no sharp lines of demarcation are left in the tread surface. The curved face 19 is not required for successful employment of the invention, but does produce a more attractive appearance.

I claim:
1. A method for improving the radial force uniformity of a pneumatic tire comprising the steps of:
    measuring the maximum radial force of said tire under load and locating the point of maximum radial force,
    mounting said tire for rotation eccentrically about an axis with the point of greatest eccentricity substantially coincident with said point of maximum radial force,
    and rotating said tire in contact with abrasion means to remove a portion of the surface of said tire with the greatest amount being removed from the tire at said point of maximum force.
2. A method as in claim 1, wherein said abrasion means are positioned to remove a pre-determined depth of said tread surface at said point of maximum radial force, said depth determined by the relationship

$$R = KF$$

where R is said depth in inches, F is the maximum radial force, in pounds, and K is a constant determined for each size and type of tire, having units of inches per pound.
3. A method as in claim 1, wherein essentially all of the contact of the abrasion means is with the shoulder tread ribs of said tire.
4. A method as in claim 2, wherein said constant K is determined by the relationship:

$$K = \frac{r_s - r_1}{l}$$

where $r_s$ is the standard radius in inches of the tire, $r_1$ is the radius in inches of the tire under rated load at standard pressure, and $l$ is the rated load for the tire, in pounds.

References Cited

UNITED STATES PATENTS

| | | | |
|---|---|---|---|
| 2,079,585 | 5/1937 | Sloman | 73—146 |
| 2,695,520 | 11/1954 | Karsai | 73—146 |
| 2,731,887 | 1/1956 | Sjostrand | 90—11 |
| 2,765,845 | 10/1956 | Bullis | 157—13 |
| 2,766,563 | 10/1956 | Bennett | 51—33 X |
| 2,897,882 | 8/1959 | Barrett | 157—13 |
| 2,924,048 | 2/1960 | Sjostrand | 51—165 |
| 2,966,011 | 12/1960 | Peacock | 51—33 |

LESTER M. SWINGLE, Primary Examiner

U.S. Cl. X.R.

51—106, 165; 157—13